United States Patent
Suresh et al.

(10) Patent No.: US 10,027,472 B2
(45) Date of Patent: Jul. 17, 2018

(54) NON-LINEAR PHYSICALLY UNCLONABLE FUNCTION (PUF) CIRCUIT WITH MACHINE-LEARNING ATTACK RESISTANCE

(71) Applicant: Intel Corporation, Santa Clara, CA (US)

(72) Inventors: Vikram B. Suresh, Hillsboro, OR (US); Sanu K. Mathew, Hillsboro, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/277,856

(22) Filed: Sep. 27, 2016

(65) Prior Publication Data

US 2018/0091293 A1   Mar. 29, 2018

(51) Int. Cl.
*H03K 19/00* (2006.01)
*H04L 9/00* (2006.01)
*H03K 19/003* (2006.01)
*G06N 99/00* (2010.01)

(52) U.S. Cl.
CPC ........... *H04L 9/002* (2013.01); *H03K 19/003* (2013.01); *G06N 99/005* (2013.01)

(58) Field of Classification Search
CPC ..... H04L 9/002; H03K 19/003; G06N 99/005
USPC ........................................................... 326/8
See application file for complete search history.

(56) References Cited

U.S. PATENT DOCUMENTS

| 9,088,278 | B2 * | 7/2015 | Pfeiffer | H03K 19/003 |
| 9,262,256 | B2 * | 2/2016 | Mathew | G06F 11/0793 |
| 2011/0095782 | A1 | 4/2011 | Koushanfar et al. | |
| 2012/0072476 | A1 * | 3/2012 | Bucci | H01L 23/544 708/270 |
| 2014/0327469 | A1 | 11/2014 | Pfeiffer et al. | |

(Continued)

FOREIGN PATENT DOCUMENTS

KR   10-1408619 B1   6/2014

OTHER PUBLICATIONS

Suh et al., "Physical Unclonable Functions for Device Authentication and Secret Key Generation", Design Automation Conference (DAC), Jun. 2007, 6 pages.

(Continued)

*Primary Examiner* — Daniel D Chang
(74) *Attorney, Agent, or Firm* — Schwabe, Williamson & Wyatt, P.C.

(57) ABSTRACT

Embodiments include apparatuses, methods, and systems for a physically unclonable function (PUF) circuit. The PUF circuit may include an array of PUF cells to generate respective response bits of an authentication code in response to a challenge bit string. The PUF cells may include a pair of cross-coupled inverters, the individual inverters including independently selectable pull-down or pull-up legs. One of the pull-up or pull-down legs of each inverter may be selectively activated based on the challenge bit string. The PUF cells may further include first and second configurable clock delay circuits to pass respective clock signals to pre-charge transistors of the PUF cell. A dark bit masking circuit may generate a soft dark bit mask for the PUF circuit. Other embodiments may be described and claimed.

25 Claims, 10 Drawing Sheets

(56) References Cited

U.S. PATENT DOCUMENTS

2015/0092939 A1     4/2015   Gotze et al.
2015/0236698 A1     8/2015   Pedersen

OTHER PUBLICATIONS

Ruhmair et al., "PUF Modeling Attacks on Simulated and Silicon Data" IEEE Transactions on Information Forensics and Security, (2013), 16 pages.
International Search Report and Written Opinion dated Dec. 5, 2017 for International Application No. PCT/US2017/048697, 13 pages.

* cited by examiner

NON-LINEAR PHYSICALLY UNCLONABLE FUNCTION (PUF) CIRCUIT WITH MACHINE-LEARNING ATTACK RESISTANCE

FIELD

Embodiments of the present invention relate generally to the technical field of electronic circuits, and more particularly to physically unclonable function (PUF) circuits for secure device authentication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many electronic circuits, such as computer chips, use encryption keys to authenticate with another device. The encryption key is sometimes programmed by the manufacturer and stored in fuses on the electronic circuit die. However, the fuses are prone to visual and electrical probing attacks. Furthermore, since the fuses are programmed by the manufacturer, they are vulnerable to an insider attack on the test floor.

Some circuits use a physically unclonable function (PUF) circuit to generate an authentication key for authentication of a device. The PUF circuit exploits physical variation in devices (e.g., transistors) of the PUF circuit to generate the authentication key. However, current digital PUF circuits have a linear relationship between challenge-response pairs, thereby making them susceptible to machine-learning attacks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
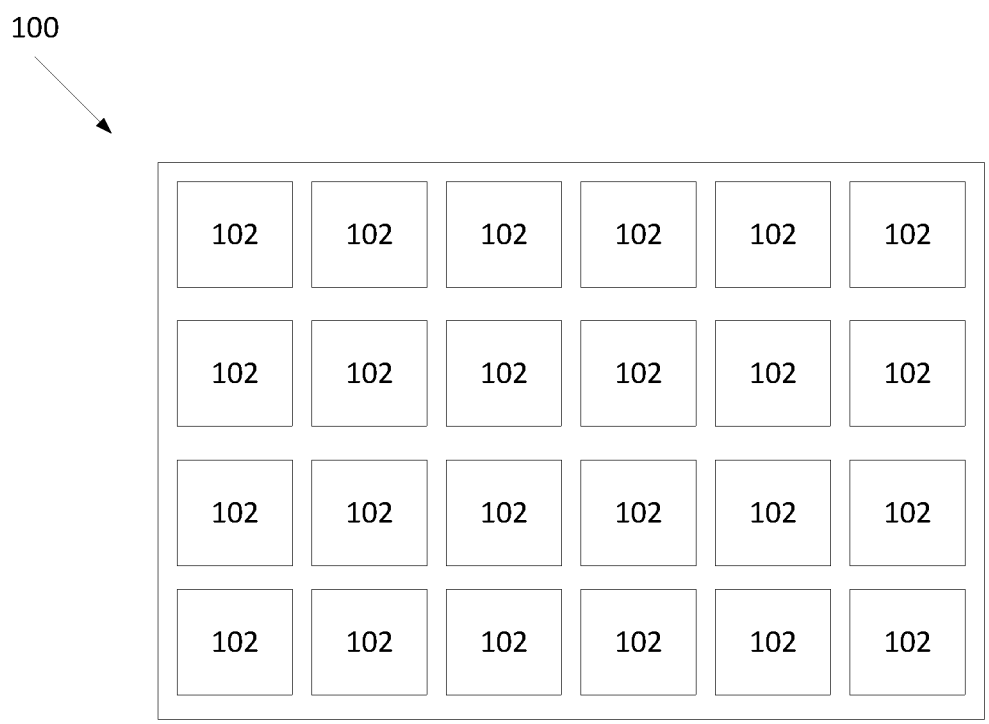
FIG. 1 illustrates a physically unclonable function (PUF) circuit in accordance with various embodiments.

Embodiments include apparatuses, methods, and systems for a physically unclonable function (PUF) circuit. The PUF circuit may include an array of PUF cells to generate respective response bits of an authentication code in response to a challenge bit string. The PUF cells may include a pair of cross-coupled inverters, the individual inverters including independently selectable pull-down or pull-up legs. One of the pull-up or pull-down legs of each inverter may be selectively activated based on the challenge bit string, and the activated pull-up or pull-down legs may be used to generate the response bit.

Pre-charge transistors may be coupled to the output node and the output bar node to pre-charge the output node and the output bar node to the same voltage level during a pre-charge phase of the PUF cell. The pre-charge transistors may be turned off by respective clock signals to transition the PUF cell to the evaluation phase in which the PUF cell generates the response bit. In some embodiments, the PUF cells may further include first and second configurable clock delay circuits to pass respective clock signals to the pre-charge transistors of the PUF cell. The clock delay circuits may include multiple independently selectable delay cells that may be independently activated on the clock delay path to generate the respective clock signal. One of the delay cells of each clock delay circuit may be activated based on the challenge bit string.

The value of the response bit generated by the PUF cell at the output node may depend on the activated inverters of the clock delay circuits and on the activated pull-down legs or pull-up legs of the cross-coupled inverters. Additionally, the value of the response bit for a given challenge by different PUF cells may vary based on random process variations in the transistors of the clock delay circuits and the pull-down or pull-up legs. Accordingly, the PUF circuit may generate a set of responses to a corresponding set of challenges that is unique to the PUF circuit and may be used to authenticate the PUF circuit and/or an associated device. Furthermore, there may be a non-linear relationship between the challenge-response pairs of the PUF cells and/or PUF circuit. That is, knowledge of one challenge-response pair may not be used to predict another challenge-response pair. Accordingly, the PUF circuit may be resistant to machine-learning attacks.

In some embodiments, a dark bit masking circuit may generate a soft dark bit mask for the PUF circuit. The soft dark bit mask may be generated upon power-up of the PUF circuit. The soft dark bit mask may be on a per-challenge, a per-leg, or a per-cell basis.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates a physically unclonable function (PUF) circuit 100 in accordance with various embodiments. In some embodiments, the PUF circuit 100 may be included in an integrated circuit, such as a processor, and may be disposed on a same die as other functional blocks of the integrated circuit. The PUF circuit 100 may include a plurality of PUF cells 102. The PUF cells 102 may include for example, the PUF cell 200, the PUF cell 300, and/or the PUF cell 500 shown in FIGS. 2, 3, and 5, respectively, and discussed further below.

Individual PUF cells 102 may generate one or more output bits of an authentication key. The authentication key may be used to authenticate a device (e.g., a wireless communication device) that includes the PUF circuit 100. For example, the authentication key may be used to secure communications between the device and another device and/or between the device and the cloud. Alternatively, or additionally, the PUF circuit 100 may be used to authenticate the integrated circuit that includes the PUF circuit 100 with respect to other components of the device.

In some embodiments, the PUF circuit 100 may be used in a challenge-response authentication scheme. For example, the PUF cells 102 may receive a challenge bit string (e.g., from another device that is attempting to authenticate the integrated circuit associated with the PUF circuit 100) including one or more bits, and may generate one or more response bits in response to the challenge. The logic value of the response bit may depend on physical properties of one or more devices (e.g., transistors) of the PUF cells 102, as further discussed below. The authentication key may include one or more response bits from each of the PUF cells 102. Accordingly, the PUF circuit 100 may generate a unique authentication key in response to a given challenge bit string.

Figure 2:
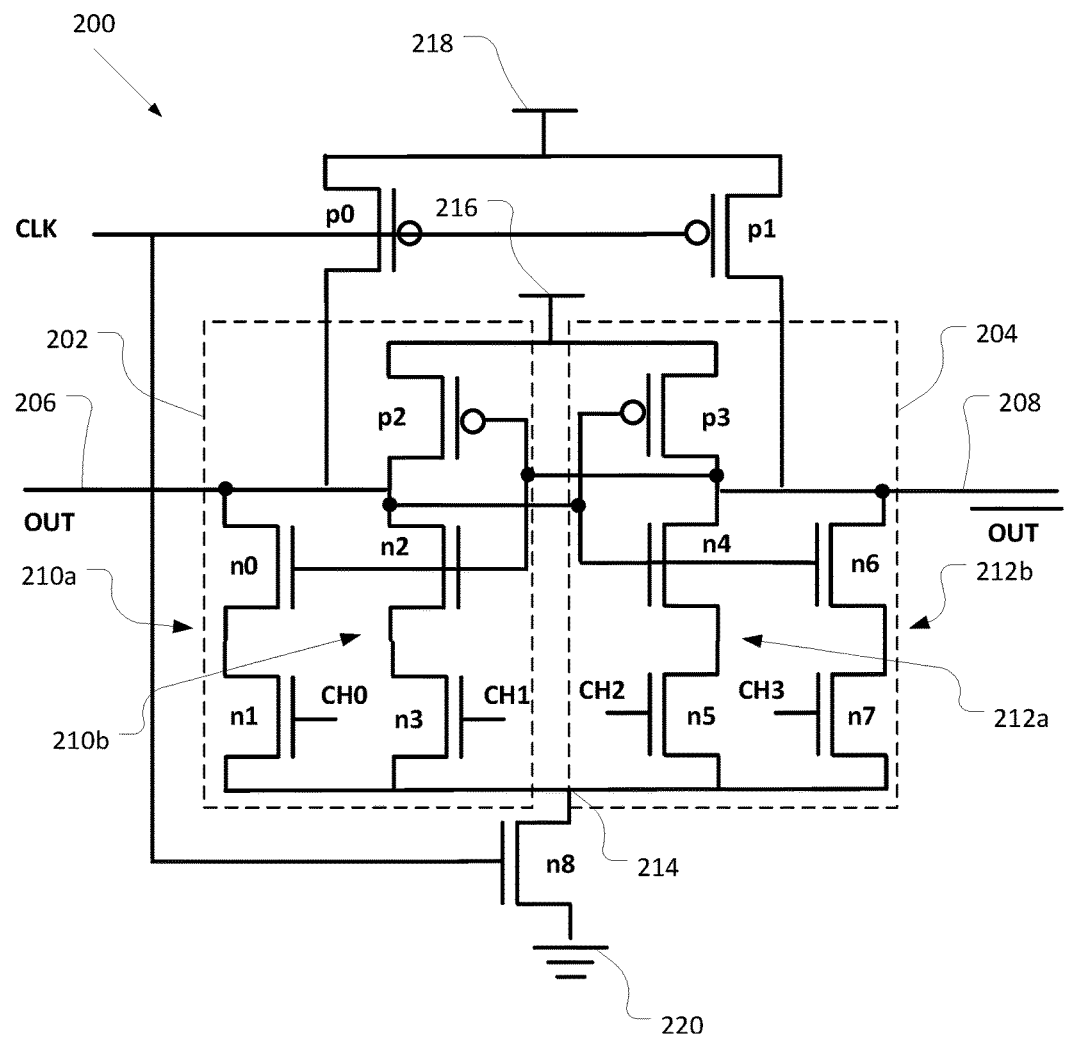
FIG. 2 illustrates a PUF cell in accordance with various embodiments.

FIG. 2 illustrates a PUF cell 200 in accordance with various embodiments. The PUF cell 200, or certain aspects of the PUF cell 200, may be included in one or more of the PUF cells 102 of PUF circuit 100.

The PUF cell 200 may include a pair of cross-coupled inverters 202 and 204 that are cross-coupled between an output node 206 and an output bar node 208. For example, an input terminal of the inverter 202 may be coupled to the output bar node 208 and an output terminal of the inverter 202 may be coupled to the output node 206, while an input terminal of the inverter 204 may be coupled to the output node 206 and an output terminal of the inverter 204 may be coupled to the output bar node 208.

The individual inverters 202 or 204 may include a plurality of pull-down legs that may be individually selectable based on a received challenge bit string. For example, inverter 202 may include pull-down legs 210a-b, and inverter 204 may include pull-down legs 212a-b. Although the inverters 202 and 204 are shown in FIG. 2 to each include two pull-down legs 210a-b and 212a-b, in other embodiments the inverters 202 and/or 204 may include more than two pull-down legs.

Pull-down legs 210a-b may include a pair of transistors coupled in series between the output node 206 and a node 214, and pull-down legs 212a-b may include a pair of transistors coupled in series between the output bar node 208 and the node 214. For example, pull-down leg 210a may include transistor n0 and transistor n1, pull-down leg 210b may include transistor n2 and transistor n3, pull-down leg 212a may include transistor n4 and transistor n5, and pull-down leg 212b may include transistor n6 and transistor n7. Gate terminals of transistors n0 and n2 may be coupled to the output bar node 208, and gate terminals of transistors n4 and n6 may be coupled to the output node 206. Gate terminals of the transistors n1, n3, n5, and n7 may receive respective challenge bits of the challenge bit string. The challenge bit string may selectively activate one of the pull-down legs 210a-b and one of the pull-down legs 212a-b, as further discussed below.

The inverter 202 may further include a pull-up transistor p2 coupled between the output node 206 and a supply terminal 216. The supply terminal 216 may receive a supply voltage (e.g., Vcc). The inverter 204 may further include a pull-up transistor p3 coupled between the output bar node 208 and the supply terminal 216. A gate terminal of the transistor p2 may be coupled to the output bar node 208, and a gate terminal of the transistor p3 may be coupled to the output node 206.

In various embodiments, the PUF cell 200 may further include a pre-charge transistor p0 coupled between the output node 206 and a supply terminal 218, and a pre-charge transistor p1 coupled between the output bar node 208 and the supply terminal 218. The supply terminal 218 may be coupled to and/or receive the same supply voltage (e.g., Vcc) as the supply terminal 216. The PUF cell 200 may further include a footer transistor n8 coupled between the node 214 and ground 220. The gate terminals of the pre-charge transistors p0 and p1 and the footer transistor n8 may receive a clock signal CLK.

In various embodiments, the clock signal CLK may alternate between a first state (e.g., logic low) and a second state (e.g., logic high). The PUF cell 200 may be in a pre-charge phase when the clock signal CLK has the first state, and in an evaluation phase when the clock signal CLK has the second state. During the pre-charge phase (e.g., when the clock signal CLK is in the first state) the pre-charge transistors p0 and p1 may be on, thus charging both the output node 206 and output bar node 208 to logic high (e.g., to the voltage of the supply terminal 218 (Vcc)). The footer transistor n8 may be off, thus preventing the pull-down legs 210a-b and 212a-b from pulling down the voltage at the output node 206 and output bar node 208.

When the clock signal CLK transitions to the second state to transition the PUF cell 200 to the evaluation phase, the pre-charge transistors p0 and p1 may turn off, and the footer transistor n8 may turn on. The inverters 202 and 204 may contend to pull one of the output node 206 or the output bar node 208 to logic low (e.g., ground) and maintain the other of the output node 206 or the output bar node 208 at logic high (e.g., Vcc).

As discussed above, the transistors n1, n3, n5, and n7 of the respective pull-down legs 210a-b or 212a-b may receive respective challenge signals CH0, CH1, CH2, or CH3. The challenge signals may be derived based on the challenge bit string. The challenge signals may activate one of the pull-down legs 210a-b and one of the pull-down legs 212a-b. That is, one of the challenge signals CH0 or CH1 may be logic high (e.g., logic 1) to turn on the respective transistor n1 or n3, and the other challenge signal CH0 or CH1 may be logic low (e.g., logic 0) to turn off the respective transistor n1 or n3. Similarly, one of the challenge signals CH2 or CH3 may be logic high to turn on the respective transistor n5 or n7, and the other challenge signal CH2 or CH3 may be logic low to turn off the respective transistor n5 or n7. In embodiments in which the inverters 202 and 204 include more than two pull-down legs 210a-b or 212a-b, one of the challenge signals received by the pull-down legs of the respective inverter may be activated while the remaining pull-down legs may be deactivated. Accordingly, the set of challenge signals received by each inverter 202 and 204 may be referred to as "one-hot" signals.

The value of the response bit generated by the PUF cell 200 at the output node 206 may depend on the pair of activated pull-down legs 210a-b and 212a-b. For example, the value of the response bit may depend on the relative pull-down strength of the activated pull-down leg 210a-b of the inverter 202 compared with the activated pull-down leg 212a-b of the inverter 204. The pull-down strength of the pull-down legs 210a-b and 212a-b may be based on random process variations. Accordingly, the PUF cell 200 may generate a set of responses to a corresponding set of challenges that is unique to the PUF cell 200 and may be used to authenticate the PUF cell 200. Furthermore, there may be a non-linear relationship between challenge-response pairs of the PUF cell 200. That is, knowledge of one challenge-response pair may not be used to predict another challenge-response pair. Accordingly, the PUF cell 200 may be resistant to machine-learning attacks.

Figure 3:
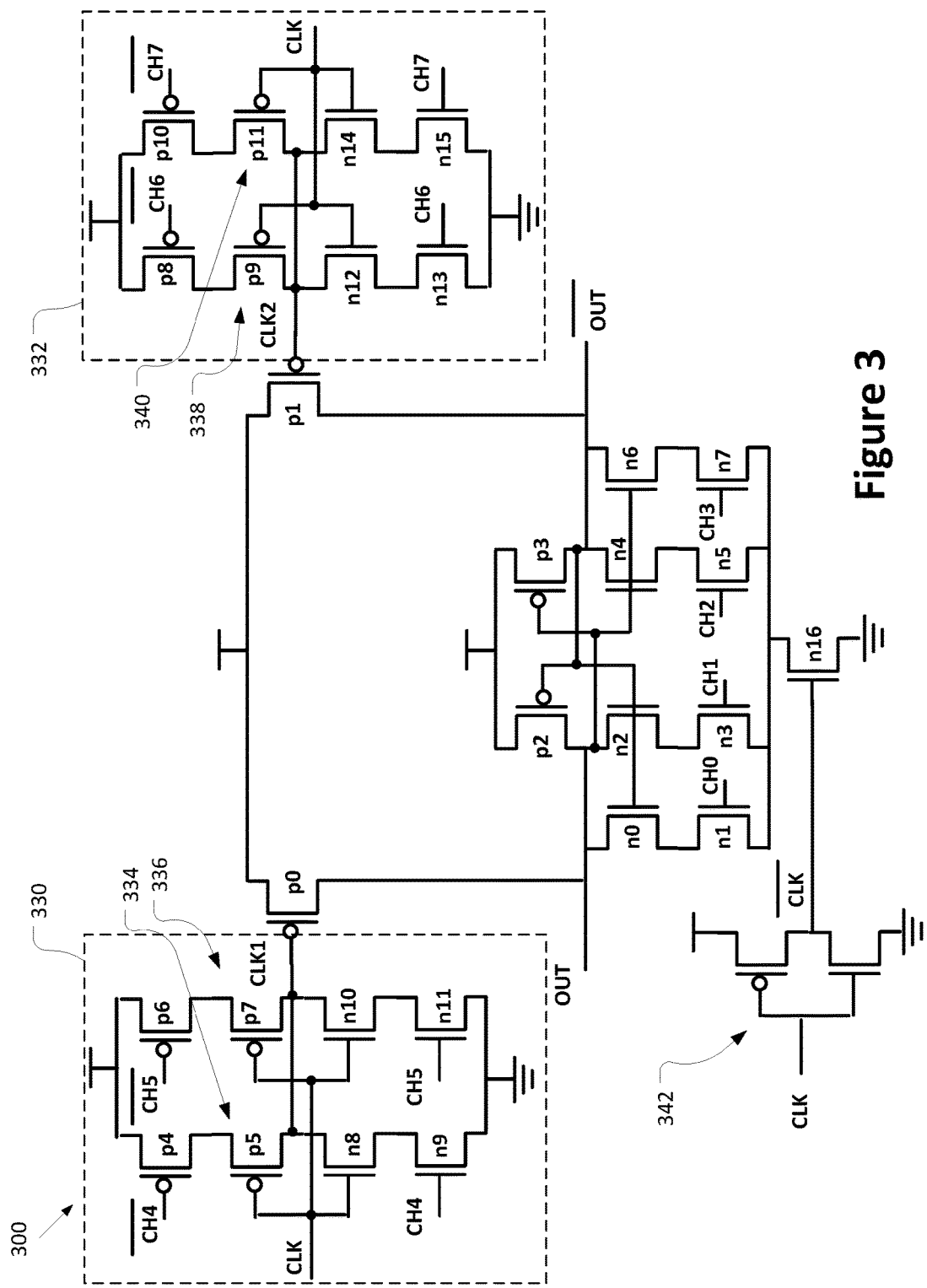
FIG. 3 illustrates another PUF cell in accordance with various embodiments.

FIG. 3 illustrates another PUF cell 300 in accordance with various embodiments. The PUF cell 300, or certain aspects of the PUF cell 300, may be included in one or more of the PUF cells 102 of PUF circuit 100.

The PUF cell 300 may include the circuitry of the PUF cell 200, as shown. The PUF cell 300 may further include clock delay circuits 330 and 332. The clock delay circuit 330 may be coupled to the gate terminal of the pre-charge transistor p0, and may receive an input clock signal CLK and provide a first delayed clock signal CLK1 to the pre-charge transistor p0. The clock delay circuit 332 may be coupled to the gate terminal of the pre-charge transistor p1, and may receive the input clock signal CLK and provide a second delayed clock signal CLK2 to the pre-charge transistor p1.

The clock delay circuits 330 and 332 may include a plurality of delay cells that may be selectively activated on the clock delay path to generate the respective delayed clock signal CLK1 or CLK2 from the clock signal CLK. The delay cells may include one or more inverters, buffers, and/or other delay elements. For example, as shown in FIG. 3, the clock delay circuit 330 may include inverters 334 (including transistors p5 and n8) and 336 (including transistors p7 and n10) and clock delay circuit 332 may include inverters 338 (including transistors p9 and n12) and 340 (including transistors p11 and n14). Both of the inverters 334 and 336 may have their input terminals coupled to receive the input clock signal and their output terminals coupled to the gate terminal of the pull-up transistor p0, and both of the inverters 334 and 336 may have their input terminals coupled to receive the input clock signal and their output terminals coupled to the gate terminal of the pull-up transistor p1. Although the clock delay circuits 330 and 332 are shown in FIG. 3 to each include two independently selectable delay cells, in other embodiments the clock delay circuits 330 and 332 may include more than two independently selectable delay cells.

In various embodiments, the inverters (e.g., inverters 334 and 336 of clock delay circuit 330 and inverters 338 and 340 of clock delay circuit 332) may be selectively activated on the clock delay path based on the challenge bit string to generate the respective delayed clock signal (e.g., CLK1 or CLK2). For example, the clock delay circuit 330 may receive a set of one-hot challenge signals to selectively activate one of the inverters 334 or 336 and the clock delay circuit 332 may receive a second set of one-hot challenge signals to selectively activate one of the inverters 338 or 340. The challenge signals may be derived based on the challenge bit string. Accordingly, the delayed clock signals CLK1 and CLK2 may transition from the first state to the second state at different times depending on which inverters are activated in the clock delay circuit 332 and the clock delay circuit 334, thereby adding further variability in the response of the PUF cell 300 to a challenge.

For example, the clock delay circuit 330 may further include select transistors p4, p6, n9, and n11 that receive respective challenge signals CH4 bar, CH5 bar, CH4, and CH5. The challenge signals CH4 bar, CH5 bar, CH4, and CH5 may selectively activate one of the inverter 334 or the inverter 336 and deactivate the other one of the inverter 334 or the inverter 336.

The clock delay circuit 332 may further include select transistors p8, p10, n13, and n15 that receive respective challenge signals CH6 bar, CH7 bar, CH6, and CH7. The challenge signals CH6 bar, CH7 bar, CH6, and CH7 may selectively activate one of the inverter 338 or the inverter 340 and deactivate the other one of the inverter 338 or the inverter 340.

The PUF cell 300 may further include an inverter 342 coupled to the gate terminal of the footer transistor n16 to pass a clock bar signal to the gate terminal of the transistor n16. The inverter 342 may be included to account for the inversion and delay of the clock signal CLK provided by the clock delay circuits 330 and 332.

Figure 4:
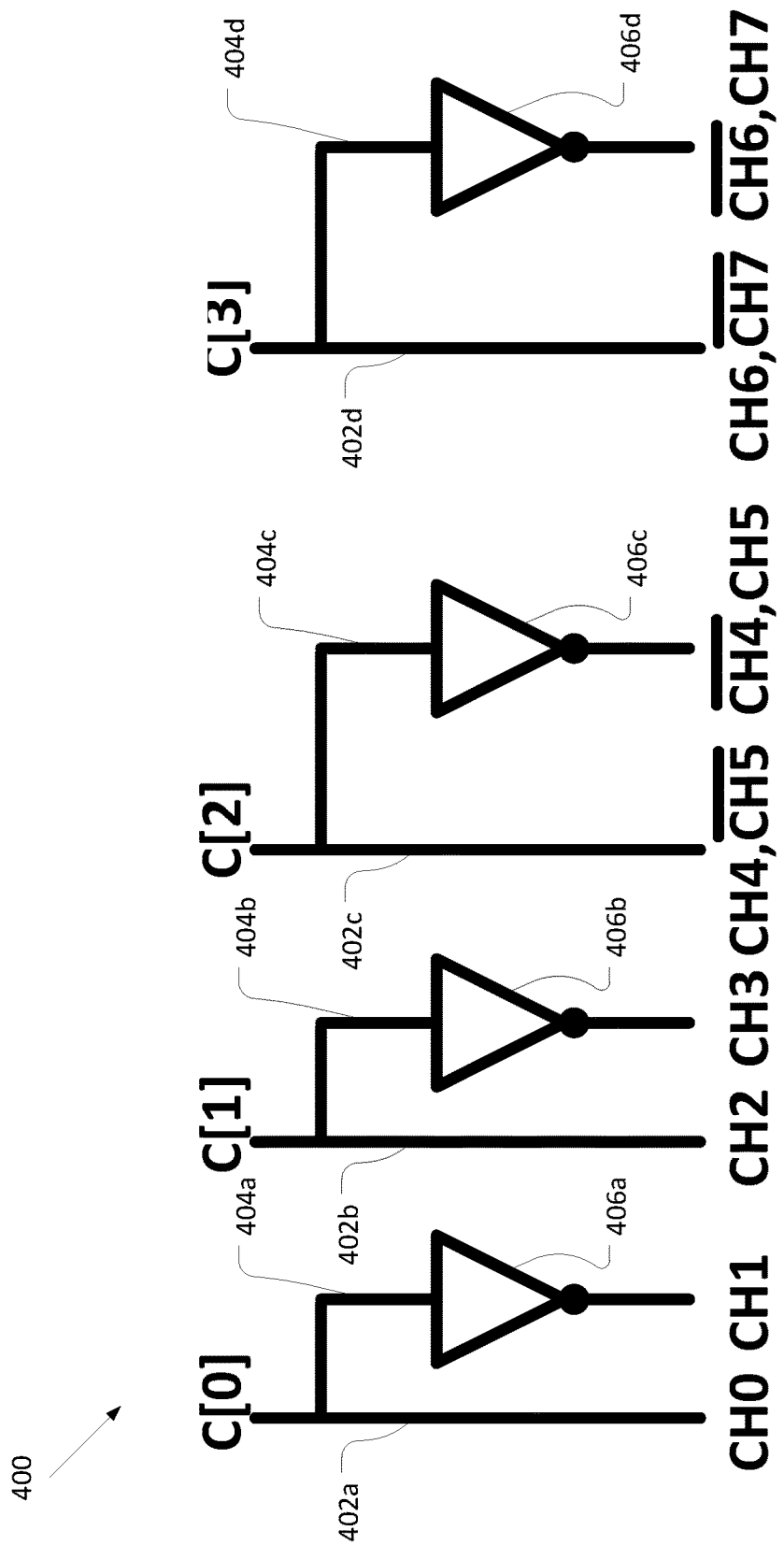
FIG. 4 illustrates a circuit to generate challenge signals for a PUF cell based on a challenge bit string, in accordance with various embodiments.

FIG. 4 illustrates a circuit 400 to receive a 4-bit challenge bit string (e.g., challenge bits C[0], C[1], C[2], and C[3]) and generate the challenge signals for the PUF cell 300 (e.g., CH0, CH1, CH2, CH3, CH4, CH4 bar, CH5, CH5 bar, CH6, CH6 bar, CH7, and CH7 bar). The circuit 400 may generate four sets of one-hot challenge signals based on the four respective challenge bits. For example, the circuit 400 may include non-inverted paths 402a-d and inverted paths 404a-d. The non-inverted paths 402a-d may pass the logic value of the challenge bit as the respective challenge signal, while the inverted paths 404a-d may include an inverter 406a-d to invert the logic value of the challenge bit and pass the inverted value as the respective challenge signal.

Figure 5:
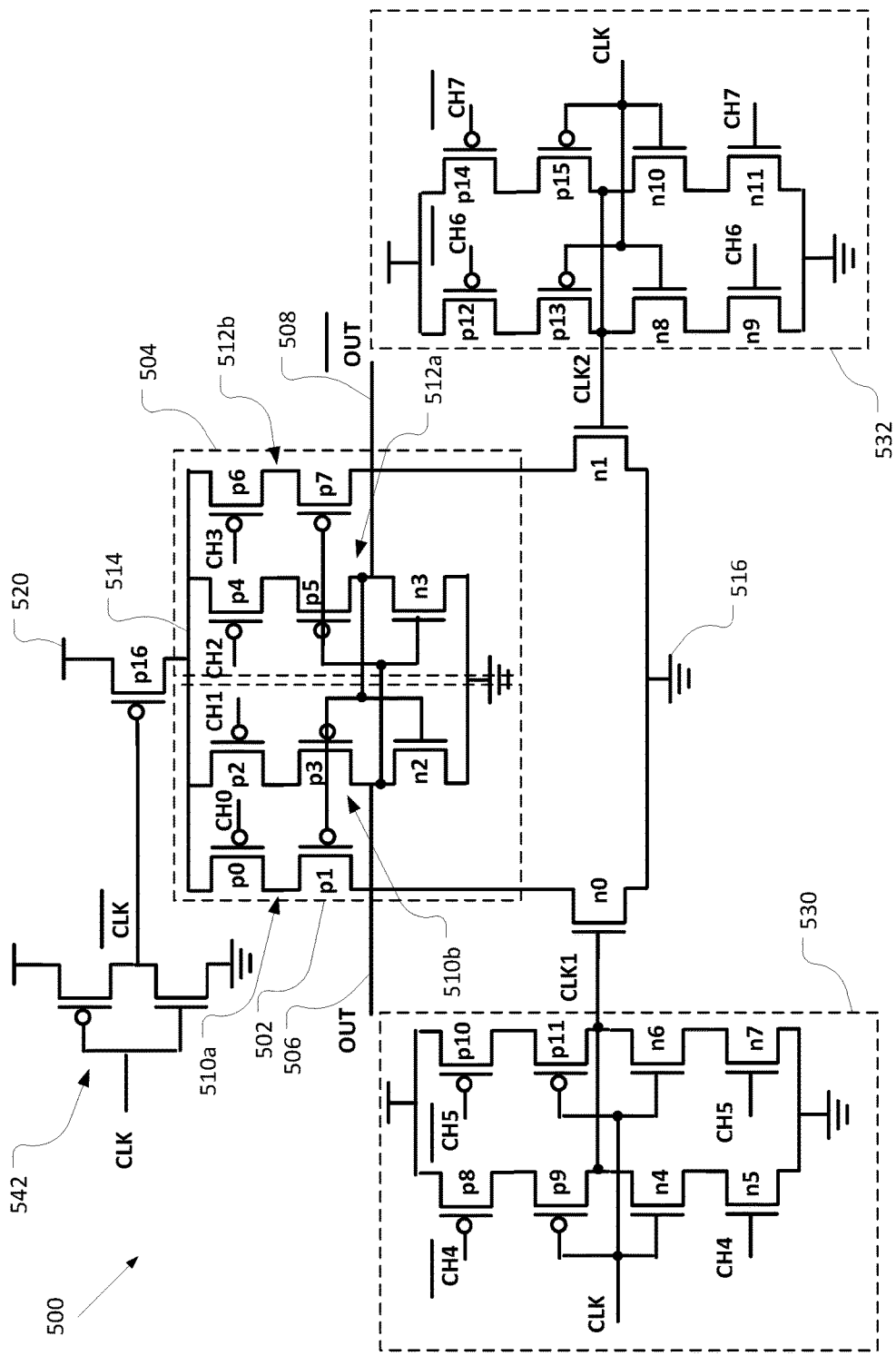
FIG. 5 illustrates another PUF cell in accordance with various embodiments.

FIG. 5 illustrates another PUF cell 500 that includes a plurality of pull-up legs instead of the plurality of pull-down legs of PUF cells 200 and 300. The PUF cell 500, or certain aspects of the PUF cell 500, may be included in one or more of the PUF cells 102 of PUF circuit 100.

The PUF cell 500 may include a pair of cross-coupled inverters 502 and 504 that are cross-coupled between an output node 506 and an output bar node 508. For example, an input terminal of the inverter 502 may be coupled to the output bar node 508 and an output terminal of the inverter 502 may be coupled to the output node 506, while an input terminal of the inverter 504 may be coupled to the output node 506 and an output terminal of the inverter 504 may be coupled to the output bar node 508.

The individual inverters 502 or 504 may include a plurality of pull-up legs that may be individually selectable based on a received challenge bit string. For example, inverter 502 may include pull-up legs 510a-b, and inverter 504 may include pull-up legs 512a-b. Pull-up legs 510a-b may include a pair of transistors coupled in series between the output node 506 and a node 514, and pull-up legs 512a-b may include a pair of transistors coupled in series between the output bar node 508 and the node 514. For example, pull-up leg 510a may include transistor p0 and transistor p1, pull-up leg 510b may include transistor p2 and transistor p3, pull-up leg 512a may include transistor p4 and transistor p5, and pull-up leg 512b may include transistor p6 and transistor p7. Gate terminals of transistors p1 and p3 may be coupled to the output bar node 508, and gate terminals of transistors p5 and p7 may be coupled to the output node 506. Gate terminals of the transistors p0, p2, p4, and p6 may receive respective challenge signals CH0, CH1, CH2, and CH3. The challenge signals may selectively activate one of the pull-up legs 510a-b and one of the pull-up legs 512a-b, as further discussed below.

The inverter 502 may further include a pull-down transistor n2 coupled between the output node 506 and a ground terminal 516. The inverter 504 may further include a pull-down transistor n3 coupled between the output bar node 508 and the ground terminal 516. A gate terminal of the transistor n2 may be coupled to the output bar node 508, and a gate terminal of the transistor n3 may be coupled to the output node 506.

The PUF cell 500 may further include a pre-charge transistor n0 coupled between the output node 506 and ground, and a pre-charge transistor n1 coupled between the output bar node 508 and ground. The PUF cell 500 may further include a header transistor p16 coupled between the node 514 and a supply terminal 520. The supply terminal 520 may receive a supply voltage (e.g., Vcc). The gate terminals of the pre-charge transistors p0 and p1 and the transistor n8 may receive respective clock signals.

In some embodiments, as shown in FIG. 5, the PUF cell 500 may include clock delay circuits 530 and 532 coupled to the gate terminals of the pull-down transistors n0 and n1, respectively. The clock delay circuits 530 and 532 may be similar to clock delay circuits 330 and 332 of FIG. 3. The clock delay circuit 530 may pass a first delayed clock signal CLK1 to the gate terminal of the pre-charge transistor n0 and the clock delay circuit 532 may pass a second delayed clock signal CLK2 to the gate terminal of the pre-charge transistor n1. The header transistor p16 may receive a clock bar signal via an inverter 542.

In various embodiments, when the clock signal CLK is logic low (e.g., ground), the clock signals CLK1, CLK2, and CLK bar may be logic high (e.g., Vcc). Accordingly, the PUF cell 500 may be in a pre-charge phase and the pre-charge transistors n0 and n1 may be on, thus forcing both the output node 506 and output bar node 508 to logic low (e.g., ground). The transistor p16 may be off, thus preventing the pull-up legs 510a-b and 512a-b from pulling up the voltage at the output node 506 and the output bar node 508.

When the clock signal CLK transitions to logic high, the delayed clock signals CLK1 and CLK2 may transition to logic low, with a timing of the transitions depending on the inverters of the clock delay circuits 530 and 532 that are selected based on the challenge bits. When the delayed clock signals CLK1, CLK2, and CLK bar are logic low, the PUF cell 500 may be in the evaluation phase and the pull-down transistors p0 and p1 may turn off, and the transistor n8 may turn on. The inverters 502 and 504 may contend to pull one of the output node 506 or the output bar node 508 to logic high (e.g., Vcc) and maintain the other of the output node 506 or the output bar node 508 at logic low (e.g., ground).

The value of the response bit generated by the PUF cell 500 at the output node 506 may depend on the activated inverters of the clock delay circuits 530 and 532 and on the activated pull-up legs 510a-b and 512a-b of the inverters 502 and 504. The value of the response bit may be based on random process variations in the transistors of the clock delay circuits 530 and 532 and the pull-up legs 510a-b and 512a-b. Accordingly, the PUF cell 500 may generate a set of responses to a corresponding set of challenges that is unique to the PUF cell 500 and may be used to authenticate the PUF cell 500. Furthermore, there may be a non-linear relationship between the challenge-response pairs of the PUF cell 500. That is, knowledge of one challenge-response pair may not be used to predict another challenge-response pair. Accordingly, the PUF cell 500 may be resistant to machine-learning attacks.

In various embodiments, the PUF cells 200, 300, and/or 500 may generate inconsistent responses for some challenges (e.g., due to variation in voltage and/or temperature conditions). Accordingly, in some embodiments, a dark bit mask may be used to identify inconsistent responses and force them to a pre-defined value. For example, the dark bit mask may be used with respect to individual challenges, individual legs of the PUF cells (e.g., individual pull-down legs or pull-up legs of the cross-coupled inverters and/or individual delay cells of the clock delay circuits), or individual PUF cells. In various embodiments, a soft dark bit mask may be used, in which each PUF cell of the PUF circuit is tested upon power-up of the circuit to generate the soft dark bit mask. The soft dark bit mask may be resistant to physical probing attacks, to which other masking techniques, such as storing the mask information in one-time fuses, are vulnerable.

Figure 6:
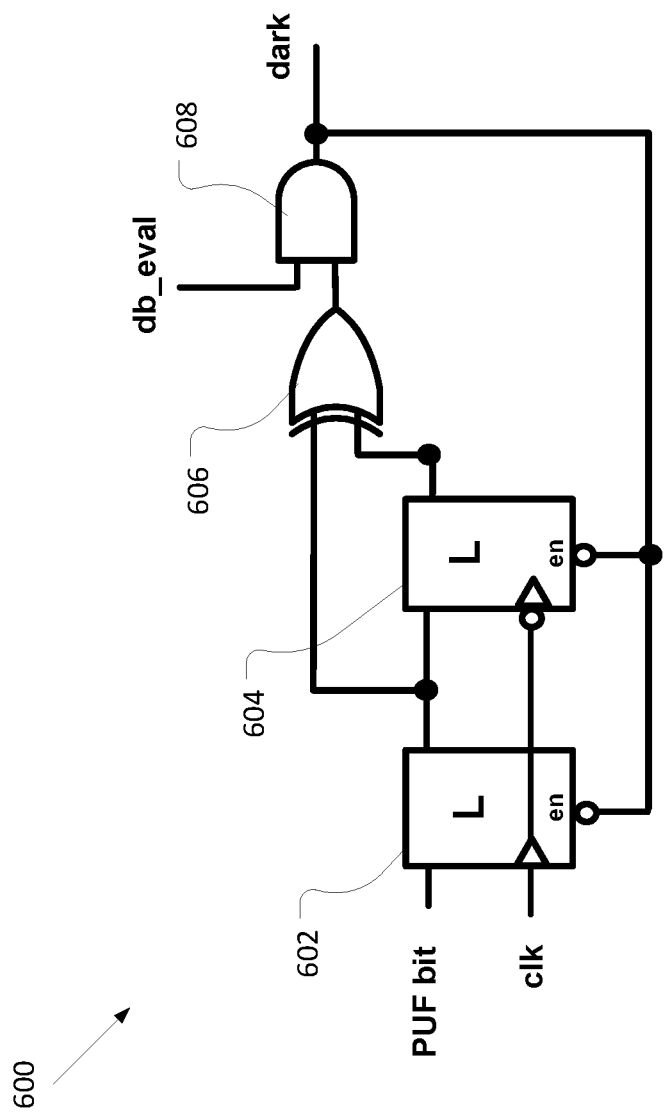
FIG. 6 illustrates a dark bit masking circuit for a PUF circuit, in accordance with various embodiments.

For example, FIG. 6 illustrates a dark bit masking circuit 600 to generate a dark bit mask on a per-challenge level, in accordance with various embodiments. The dark bit masking circuit 600 may include latches 602 and 604 coupled in series. The outputs of the latches 602 and 604 are coupled to respective input terminals of an XOR gate 606. The output of the XOR gate 606 is coupled to an input terminal of an AND gate 608, and the other input terminal of the AND gate 608 receives an enable signal db_eval. When the enable signal db_eval is logic high, the PUF cell is evaluated multiple times for each challenge. The latch 602 may output the PUF bit generated by the PUF cell for a given clock cycle, and the latch 604 may output the PUF bit generated by the PUF cell for the previous clock cycle. Accordingly, if the response for a given challenge changes over time, the output of the XOR gate 606 will change to logic high. The challenge may then be marked as a dark bit. The response of the PUF cell may be forced to a pre-determined value (e.g., logic 0 or logic 1) for challenges which are marked as dark bits.

Figure 7:
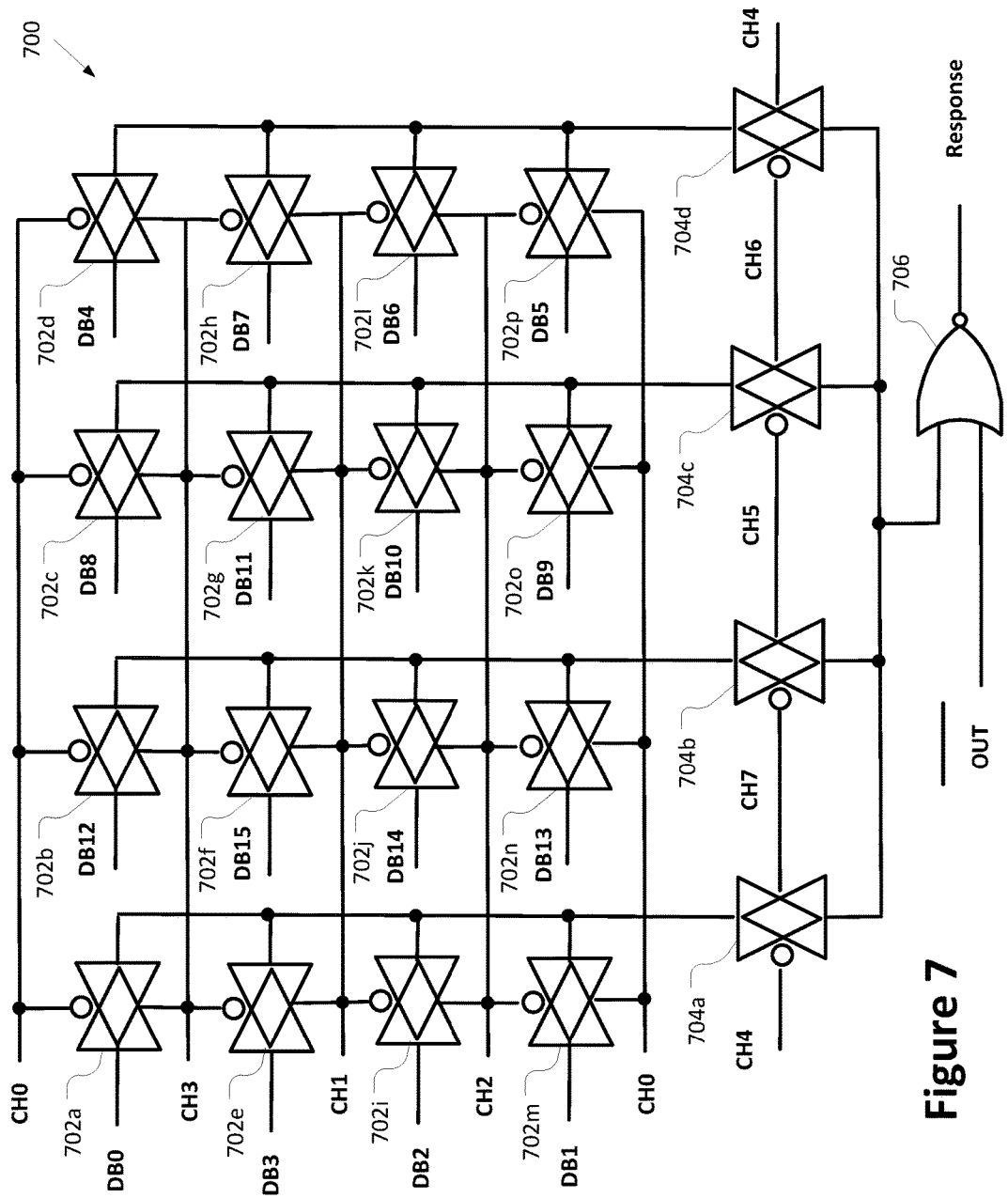
FIG. 7 illustrates a mask circuit to provide a per-challenge soft dark bit mask for a PUF cell, in accordance with various embodiments.

For example, FIG. 7 illustrates a mask circuit 700 that may be used to mask the output of the PUF cell on a per-challenge basis, in accordance with various embodiments. The mask circuit 700 may be programmed with the soft dark bit mask by the masking circuit 600 (e.g., upon power-on). The mask circuit 700 may include any suitable logic to store the soft dark bit mask.

For example, in some embodiments, the mask circuit 700 may include a plurality of transmission gates 702a-p that receive respective dark bit indicators DB0 to DB15 at their input terminals. In other embodiments, the mask circuit 700 may include other logic devices (e.g., NAND gates and/or NOR gates) instead of or in addition to the transmission gates 702a-p. The dark bit indicators DB0 to DB15 may correspond to respective challenges (e.g., one of the 16 possible values of the 4-bit challenge) and may have a first logic value (e.g., logic 1) to indicate that the respective challenge is a dark bit or a second logic value (e.g., logic 0) to indicate that the respective challenge is not a dark bit. The transmission gates 702a-p may be arranged in columns, and the output terminals of the transmission gates 702a-p of the same column may be coupled to one another. The mask circuit 700 may further include transmission gates 704a-d with input terminals coupled to the output terminals of the transmission gates 702a-p of respective columns, as shown. The output terminals of the transmission gates 704a-d may be coupled to a first input terminal of a NOR gate 706. A second input terminal of the NOR gate 706 may receive the output bar signal from the corresponding PUF cell (e.g., the signal at the output bar node of the PUF cell).

The control terminals of the transmission gates 702a-p and 704a-d may receive respective challenge signals CH0-CH7 as shown. In various embodiments, for a given challenge, the mask circuit 700 may pass the dark bit value that corresponds to the challenge to the first input terminal of the NOR gate. As discussed above, the dark bit indicator may be a logic 1 if the corresponding challenge is a dark bit and a logic 0 if the corresponding challenge is not a dark bit. Accordingly, if the challenge is a dark bit, the output of the NOR gate 706 may be forced to a logic 0 regardless of the value of the output bar signal. However, if the challenge is not a dark bit, the output of the NOR gate 706 will be the value of the output signal of the PUF cell (e.g., the inverse of the value of the output bar signal).

In other embodiments, the mask circuit 700 may force the output to a logic 1 for a dark bit. For example, the dark bit indicator may be a logic 0 instead of a logic 1, and the mask circuit 700 may include a NAND gate instead of the NOR gate 706.

Figure 8:
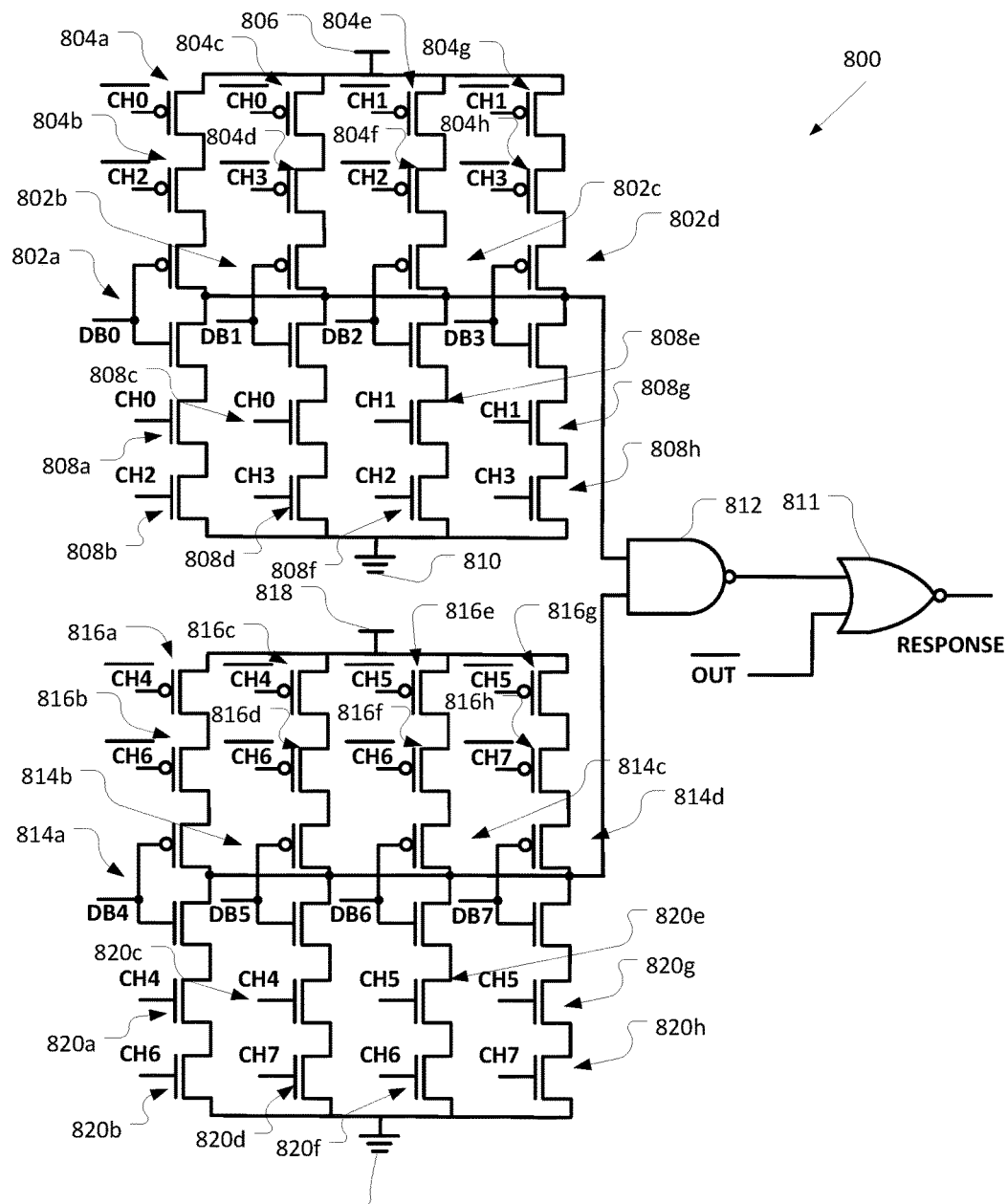
FIG. 8 illustrates a mask circuit to provide a per-leg soft dark bit mask for a PUF cell, in accordance with various embodiments.

FIG. 8 illustrates another mask circuit 800 that may be used to mask the output of the PUF cell on a per-leg basis, in accordance with various embodiments. The mask circuit 800 may use 8 dark bit indicators to indicate whether individual selectable legs (e.g., pull-down or pull-up legs and inverters of the clock delay circuits) are marked as dark. If a leg is marked as dark, then the mask circuit 800 forces the output to a pre-determined value for all challenges that involve that leg.

The mask circuit 800 may include inverters 802a-d to receive respective dark bit indicators DB0, DB1, DB2, and DB3 that correspond to legs of the cross-coupled inverters in the PUF cell (e.g., the inverters 302 and 304). Each of the inverters 802a-d may include a pair of transistors 804a-h coupled between a first power terminal of the inverter and a supply rail 806 and a pair of transistors 808a-h coupled between a second power terminal of the inverter and a ground terminal 810.

The transistors 804a-h and 808a-h may receive respective challenge signals, as shown. The output terminals of the inverters 802a-d may be coupled to a first input terminal of an OR gate 812. A NOR gate 811 may receive as inputs the output of the OR gate 812 and the output bar signal from the PUF cell.

The mask circuit 800 may further include inverters 814a-d to receive respective dark bit indicators DB4, DB5, DB6, and DB7 that correspond to legs of the clock delay circuits in the PUF cell (e.g., the inverters 334 and 336 of the clock delay circuit 330 and the inverters 338 and 340 of the clock delay circuit 332). Each of the inverters 814a-d may include a pair of transistors 816a-h coupled between a first power terminal of the inverter and a supply rail 818 and a pair of transistors 820a-h coupled between a second power terminal of the inverter and a ground terminal 822. The transistors 816a-h and 820a-h may receive respective challenge signals, as shown. The output terminals of the inverters 814a-d may be coupled to a second input terminal of the OR gate 812.

For a given challenge, the challenge signals may activate the inverters 802a-d and 814a-d that correspond to the legs that are selected by the challenge. If one of the legs is marked as a dark bit, the inverter will output a logic 0 bit and the OR gate 812 will output a logic 1. Accordingly, the response bit output by the NOR gate 811 will be forced to a logic 0 regardless of the value of the output bar signal. However, if none of the legs corresponding to the challenge are a dark bit, the output of the NOR gate 811 will be the value of the output signal of the PUF cell (e.g., the inverse of the value of the output bar signal).

In other embodiments, the pre-determined value may be a logic 1 instead of a logic 0. Additionally, or alternatively, the mask circuit 800 may include different logic gates instead of the inverters 802a-d and 814a-d to realize a similar functionality.

Figure 9:
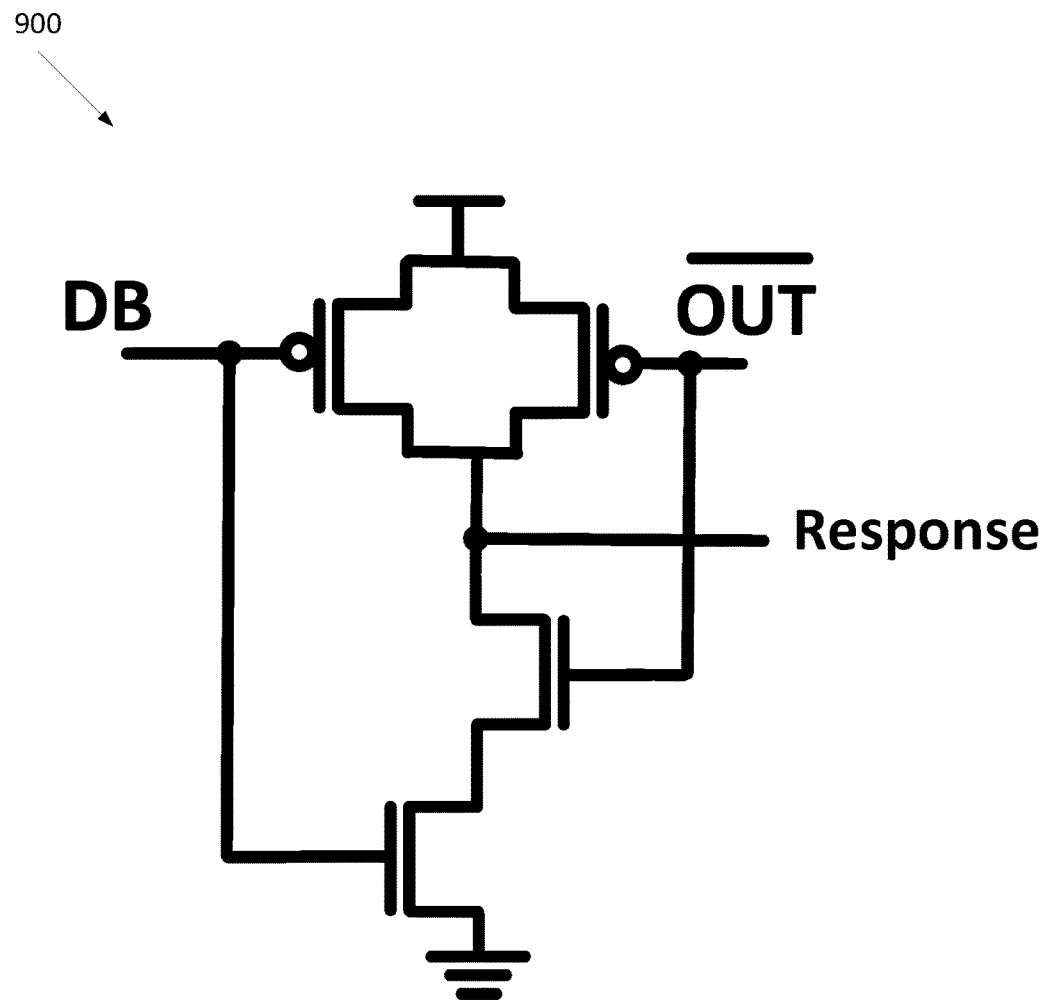
FIG. 9 illustrates a mask circuit to provide a per-cell soft dark bit mask for a PUF cell, in accordance with various embodiments.

FIG. 9 illustrates a mask circuit 900 that may be used to mask the output of the PUF cell on a per-cell basis, in accordance with various embodiments. The mask circuit 900 may be used in conjunction with the dark bit masking circuit 600. If the dark bit masking circuit 600 determines that the PUF cell is unreliable, the dark bit indicator DB may have a value of logic 1. Accordingly, the response bit may be forced to a value of logic 0. If the dark bit indicator DB has a value of logic 0, to indicate that the PUF cell is reliable, then the response bit may have the value of the output signal of the PUF cell (e.g., the inverse of the value of the output bar signal).

Figure 10:
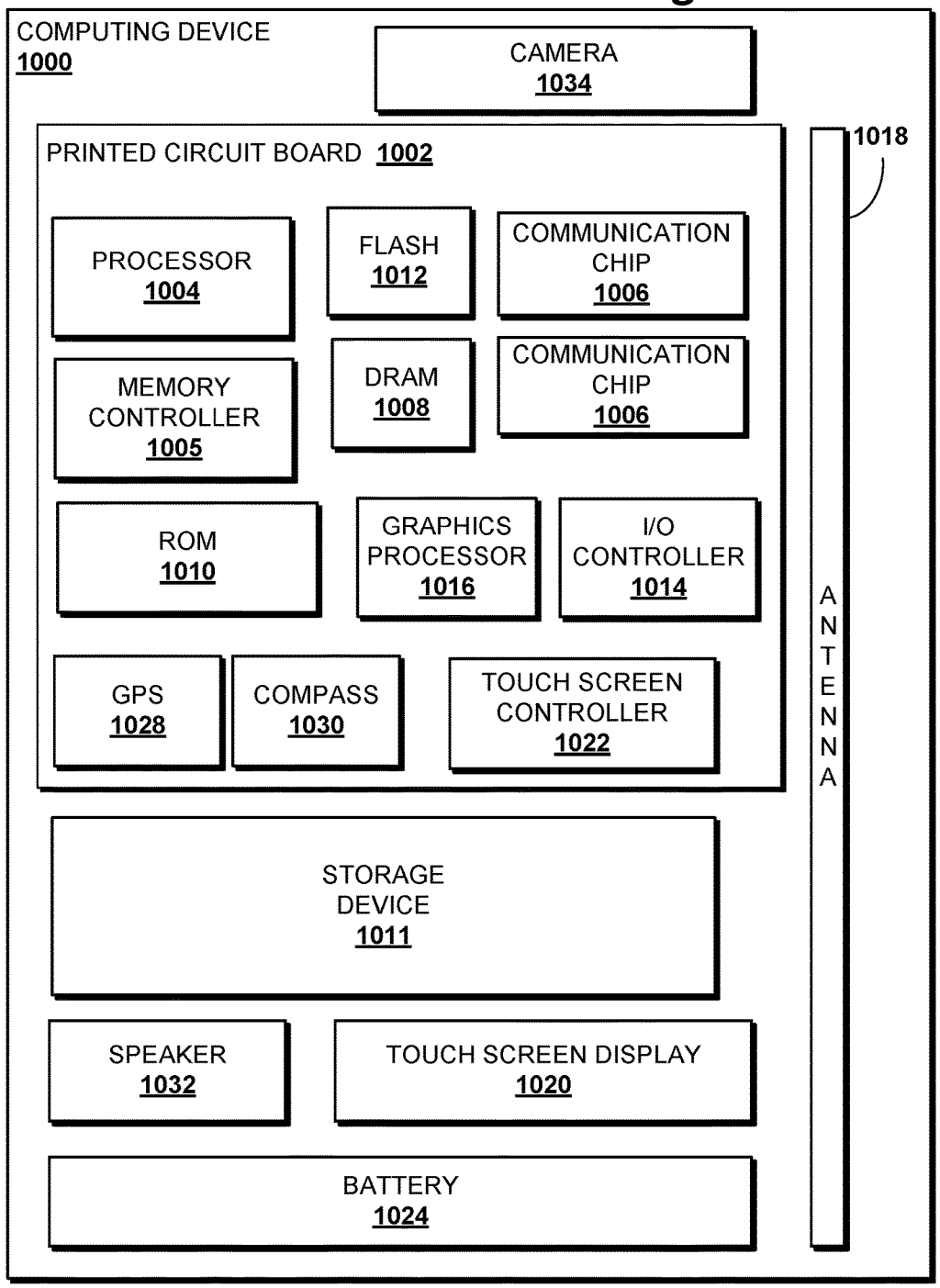
FIG. 10 illustrates an example system configured to employ the apparatuses and methods described herein, in accordance with various embodiments.

FIG. 10 illustrates an example computing device 1000 that may employ the apparatuses and/or methods described herein (e.g., PUF circuit 100, PUF cell 200, PUF cell 300, circuit 400, PUF cell 500, dark bit masking circuit 600, mask circuit 700, mask circuit 800, and/or mask circuit 900), in accordance with various embodiments. As shown, computing device 1000 may include a number of components, such as one or more processor(s) 1004 (one shown) and at least one communication chip 1006. In various embodiments, the one or more processor(s) 1004 each may include one or more processor cores. In various embodiments, the at least one communication chip 1006 may be physically and electrically coupled to the one or more processor(s) 1004. In further implementations, the communication chip 1006 may be part of the one or more processor(s) 1004. In various embodiments, computing device 1000 may include printed circuit board (PCB) 1002. For these embodiments, the one or more processor(s) 1004 and communication chip 1006 may be disposed thereon. In alternate embodiments, the various components may be coupled without the employment of PCB 1002.

Depending on its applications, computing device 1000 may include other components that may or may not be physically and electrically coupled to the PCB 1002. These other components include, but are not limited to, memory controller 1005, volatile memory (e.g., dynamic random access memory (DRAM) 1008), non-volatile memory such as read only memory (ROM) 1010, flash memory 1012, storage device 1011 (e.g., a hard-disk drive (HDD)), an I/O controller 1014, a digital signal processor (not shown), a crypto processor (not shown), a graphics processor 1016, one or more antenna 1018, a display (not shown), a touch screen display 1020, a touch screen controller 1022, a battery 1024, an audio codec (not shown), a video codec (not shown), a global positioning system (GPS) device 1028, a compass 1030, an accelerometer (not shown), a gyroscope (not shown), a speaker 1032, a camera 1034, and a mass storage device (such as hard disk drive, a solid state drive, compact disk (CD), digital versatile disk (DVD)) (not shown), and so forth. In various embodiments, the processor 1004 may be integrated on the same die with other components to form a System on Chip (SoC).

In some embodiments, the one or more processor(s) 1004, flash memory 1012, and/or storage device 1011 may include associated firmware (not shown) storing programming instructions configured to enable computing device 1000, in response to execution of the programming instructions by one or more processor(s) 1004, to practice all or selected aspects of the methods described herein. In various embodiments, these aspects may additionally or alternatively be implemented using hardware separate from the one or more processor(s) 1004, flash memory 1012, or storage device 1011.

In various embodiments, one or more components of the computing device 1000 may include the PUF circuit 100, PUF cell 200, PUF cell 300, circuit 400, PUF cell 500, dark bit masking circuit 600, mask circuit 700, mask circuit 800, and/or mask circuit 900 described herein. For example, the PUF circuit 100, PUF cell 200, PUF cell 300, circuit 400, PUF cell 500, dark bit masking circuit 600, mask circuit 700, mask circuit 800, and/or mask circuit 900 may be included in processor 1004, communication chip 1006, I/O controller 1014, memory controller 1005, and/or another component of computing device 1000. The PUF circuit 100, PUF cell 200, PUF cell 300, circuit 400, PUF cell 500, dark bit masking circuit 600, mask circuit 700, mask circuit 800, and/or mask circuit 900 may be used to generate an authentication code as described herein. The authentication code may be used to authenticate the computing device 1000 with another device and/or to authenticate a component of the computing device 1000 with another component of the computing device 1000. For example, the computing device 1000 may receive one or more challenges from another device, and may generate respective one or more responses based on the one or more challenges.

The communication chips 1006 may enable wired and/or wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth, and a second communication chip 1006 may be dedicated to longer range wireless communications such as GPS, EDGE, GPRS, CDMA, WiMAX, LTE, Ev-DO, and others.

In various implementations, the computing device 1000 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 1000 may be any other electronic device that processes data.

Some non-limiting Examples of various embodiments are provided below.

Example 1 is a physically unclonable function (PUF) circuit comprising: an output node and an output bar node; a first inverter and a second inverter that are cross-coupled between the output node and the output bar node, wherein the first inverter includes multiple legs, wherein the legs are pull-down legs or pull-up legs, wherein one of the legs is to be selectively activated based on a challenge bit string, and wherein the activated leg is used to generate a response bit at the output node.

Example 2 is the PUF circuit of Example 1, wherein the second inverter includes multiple legs, and wherein one of the legs of the second inverter is to be selectively activated based on the challenge bit string, and wherein the activated leg of the second inverter is used to generate the response bit at the output node.

Example 3 is the PUF circuit of Example 1, further comprising: a first pre-charge transistor coupled to the output node; a second pre-charge transistor coupled to the output bar node; wherein the first and second pre-charge transistors are to force the output node and the output bar node to a same voltage level during a pre-charge phase of the PUF circuit, and wherein the response bit is generated during an evaluation phase of the PUF circuit after the pre-charge phase.

Example 4 is the PUF circuit of Example 3, wherein the first pre-charge transistor is to force the output node to the voltage level responsive to a first clock signal, wherein the second pre-charge transistor is to force the output bar node to the voltage level responsive to a second clock signal, and wherein the PUF circuit further comprises: a first clock delay circuit coupled to the first pre-charge transistor to generate the first clock signal; and a second clock delay circuit coupled to the second pre-charge transistor to generate the second clock signal, wherein the first and second clock delay circuits include multiple delay cells wherein one of the delay cells is selectively activated based on the challenge bit string, and wherein the activated delay cell is used to generate the respective first or second clock signal.

Example 5 is the PUF circuit of Example 4, further wherein the delay cells include one or more inverters.

Example 6 is the PUF circuit of Example 1, wherein the legs are pull-down legs, and wherein individual pull-down legs include a first transistor and a second transistor coupled in series between the output node and a ground path to receive a ground potential, wherein a gate terminal of the first transistor is coupled to the output bar node, and wherein a gate terminal of the second transistor is to receive a challenge signal that is derived from the challenge bit string to selectively activate the individual pull-down leg.

Example 7 is the PUF circuit of Example 1, wherein the legs are pull-up legs, and wherein individual pull-up legs include a first transistor and a second transistor coupled in series between the output node and a supply path to receive a supply voltage, wherein a gate terminal of the first transistor is coupled to the output bar node, and wherein a gate terminal of the second transistor is to receive a challenge signal that is derived from the challenge bit string to selectively activate the individual pull-up leg.

Example 8 is the PUF circuit of any one of Examples 1 to 7, further comprising a dark bit masking circuit to generate a soft dark bit mask for the PUF circuit upon power-up of the PUF circuit.

Example 9 is the PUF circuit of Example 8, wherein the soft dark bit mask is on a per challenge level, a per leg level, or a per cell level.

Example 10 is the PUF circuit of Example 1, wherein the output node, the output bar node, the first inverter, and the second inverter are included in a PUF cell, and wherein the PUF circuit includes multiple PUF cells to generate respective response bits.

Example 11 is a physically unclonable function (PUF) circuit comprising: means to select one of multiple pull-up or pull-down legs of individual inverters of a pair of cross-coupled inverters based on a challenge bit string; and means to generate a response bit using the selected pull-up or pull-down leg of each inverter.

Example 12 is the PUF circuit of Example 11, further comprising: means to pre-charge an output node responsive to a first clock signal; means to pre-charge an output bar node responsive to a second clock signal; means to selectively insert one or more devices in a first delay path of the first clock signal based on the challenge bit string; and means to selectively insert one or more devices in a second delay path of the second clock signal based on the challenge bit string.

Example 13 is the PUF circuit of Example 11 or Example 12, further comprising means to generate a soft dark bit mask for the PUF circuit responsive to power-up of the PUF circuit.

Example 14 is the PUF circuit of Example 13, wherein the soft dark bit mask is on a per challenge level, a per leg level, or a per cell level.

Example 15 is a computing system comprising: a processor; a physically unclonable function (PUF) circuit coupled to the processor, the PUF circuit including a plurality of PUF cells to generate a response bit based on a challenge bit string, individual PUF cells including a pair of cross-coupled inverters coupled between an output node and an output bar node, individual inverters of the cross-coupled inverters including multiple pull-up or pull-down legs, wherein one of the pull-up or pull-down legs is selectively activated based on the challenge bit string.

Example 16 is the system of Example 15, further comprising: a first pre-charge transistor to provide the output node with a first voltage level during a pre-charge phase responsive to a first clock signal; a second pre-charge transistor to provide the output bar node with the first voltage level during the pre-charge phase responsive to a second clock signal; a first clock delay circuit coupled to the first pre-charge transistor to generate the first clock signal; and a second clock delay circuit coupled to the second pre-charge transistor to generate the second clock signal, wherein the first and second clock delay circuits include multiple delay cells wherein one of the delay cells is selectively activated based on the challenge bit string, and wherein the activated delay cell is used to generate the respective first or second clock signal.

Example 17 is the system of Example 16, further wherein the delay cells include one or more inverters.

Example 18 is the system of Example 15, wherein the PUF circuit further comprises a dark bit masking circuit to generate a soft dark bit mask for the PUF circuit upon power-up of the PUF circuit.

Example 19 is the system of Example 18, wherein the soft dark bit mask is on a per challenge level, a per leg level, or a per cell level.

Example 20 is the system of any one of Examples 15 to 19, further comprising one or more of a memory, a display, or a network interface coupled to the processor.

Example 21 is the system of any one of Examples 15 to 19, wherein the system is a wireless communication device, and wherein the PUF circuit is used to authenticate the wireless communication device to other wireless communication devices.

Example 22 is a physically unclonable function (PUF) circuit comprising: a PUF array to receive a challenge bit string and generate a response bit string based on the challenge bit string; a dark bit masking circuit coupled to the PUF array to generate a soft dark bit mask for the PUF array upon power-up of the PUF array; and a mask circuit coupled to the dark bit masking circuit to temporarily store the soft dark bit mask while the circuit is powered on.

Example 23 is the circuit of Example 22, wherein the dark bit masking circuit is to generate the soft dark bit mask on a per-challenge basis.

Example 24 is the circuit of Example 22, wherein the PUF array includes individual PUF cells having a plurality of independently selectable legs that are selected, based on the challenge bit string, to be used to generate the response bit string, and wherein the dark bit masking circuit is to generate the soft dark bit mask on a per-leg basis.

Example 25 is the circuit of Example 22, wherein the PUF array includes a plurality of PUF cells to generate one or more bits of the response bit string, and wherein the dark bit masking circuit is to generate the soft dark bit mask on a per-cell basis.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A physically unclonable function (PUF) circuit comprising:
    an output node and an output bar node; and
    a first inverter and a second inverter that are cross-coupled between the output node and the output bar node, wherein the first inverter includes multiple legs, wherein the legs are pull-down legs or pull-up legs, wherein one of the legs is to be selectively activated based on a challenge bit string, and wherein the activated leg is used to generate a response bit at the output node;
    wherein individual legs of the multiple legs include a first transistor and a second transistor coupled in series between the output node and a voltage path to receive a voltage, wherein a gate terminal of the first transistor is coupled to the output bar node, and wherein a gate terminal of the second transistor is to receive a challenge signal that is derived from the challenge bit string to selectively activate the individual leg.

2. The PUF circuit of claim 1, wherein the second inverter includes multiple legs, and wherein one of the legs of the second inverter is to be selectively activated based on the challenge bit string, and wherein the activated leg of the second inverter is used to generate the response bit at the output node.

3. The PUF circuit of claim 1, further comprising:
    a first pre-charge transistor coupled to the output node;
    a second pre-charge transistor coupled to the output bar node;
    wherein the first and second pre-charge transistors are to force the output node and the output bar node to a same voltage level during a pre-charge phase of the PUF circuit, and wherein the response bit is generated during an evaluation phase of the PUF circuit after the pre-charge phase.

4. The PUF circuit of claim 3, wherein the first pre-charge transistor is to force the output node to the voltage level responsive to a first clock signal, wherein the second pre-charge transistor is to force the output bar node to the voltage level responsive to a second clock signal, and wherein the PUF circuit further comprises:
    a first clock delay circuit coupled to the first pre-charge transistor to generate the first clock signal; and
    a second clock delay circuit coupled to the second pre-charge transistor to generate the second clock signal, wherein the first and second clock delay circuits include multiple delay cells wherein one of the delay cells is selectively activated based on the challenge bit string, and wherein the activated delay cell is used to generate the respective first or second clock signal.

5. The PUF circuit of claim 4, further wherein the delay cells include one or more inverters.

6. The PUF circuit of claim 1, wherein the legs are pull-down legs, wherein the voltage path is a ground path, wherein the voltage is a ground potential, and wherein the first transistor and the second transistor are coupled in series between the output node and the ground path.

7. The PUF circuit of claim 1, wherein the legs are pull-up legs, wherein the voltage path is a supply path, wherein the voltage is a supply voltage, and wherein the first transistor and the second transistor are coupled in series between the output node and the supply path.

8. The PUF circuit of claim 1, further comprising a dark bit masking circuit to generate a soft dark bit mask for the PUF circuit upon power-up of the PUF circuit.

9. The PUF circuit of claim 8, wherein the soft dark bit mask is on a per challenge level, a per leg level, or a per cell level.

10. The PUF circuit of claim 1, wherein the output node, the output bar node, the first inverter, and the second inverter are included in a PUF cell, and wherein the PUF circuit includes multiple PUF cells to generate respective response bits.

11. A physically unclonable function (PUF) circuit comprising:
    means to select one of multiple pull-up or pull-down legs of individual inverters of a pair of cross-coupled inverters based on a challenge bit string;
    means to generate a response bit using the selected pull-up or pull-down leg of each inverter;
    means to pre-charge an output node responsive to a first clock signal;
    means to pre-charge an output bar node responsive to a second clock signal;
    means to selectively insert one or more devices in a first delay path of the first clock signal based on the challenge bit string; and
    means to selectively insert one or more devices in a second delay path of the second clock signal based on the challenge bit string.

12. The PUF circuit of claim 11, further comprising means to generate a soft dark bit mask for the PUF circuit responsive to power-up of the PUF circuit.

13. The PUF circuit of claim 12, wherein the soft dark bit mask is on a per challenge level, a per leg level, or a per cell level.

14. A computing system comprising:
    a processor; and
    a physically unclonable function (PUF) circuit coupled to the processor, the PUF circuit including a plurality of PUF cells to generate a response bit based on a challenge bit string, individual PUF cells including a pair of cross-coupled inverters coupled between an output node and an output bar node, individual inverters of the cross-coupled inverters including multiple pull-up or pull-down legs, wherein one of the pull-up or pull-down legs is selectively activated based on the challenge bit string, wherein the individual PUF cells further include:
        a first pre-charge transistor to provide the output node with a first voltage level during a pre-charge phase responsive to a first clock signal;

a second pre-charge transistor to provide the output bar node with the first voltage level during the pre-charge phase responsive to a second clock signal;

a first clock delay circuit coupled to the first pre-charge transistor to generate the first clock signal; and a second clock delay circuit coupled to the second pre-charge transistor to generate the second clock signal, wherein the first and second clock delay circuits include multiple delay cells wherein one of the delay cells is selectively activated based on the challenge bit string, and wherein the activated delay cell is used to generate the respective first or second clock signal.

15. The system of claim 14, further wherein the delay cells include one or more inverters.

16. The system of claim 14, wherein the PUF circuit further comprises a dark bit masking circuit to generate a soft dark bit mask for the PUF circuit upon power-up of the PUF circuit.

17. The system of claim 16, wherein the soft dark bit mask is on a per challenge level, a per leg level, or a per cell level.

18. The system of claim 14, further comprising one or more of a memory, a display, or a network interface coupled to the processor.

19. The system of claim 14, wherein the system is a wireless communication device, and wherein the PUF circuit is used to authenticate the wireless communication device to other wireless communication devices.

20. A physically unclonable function (PUF) circuit comprising:

an output node and an output bar node;

a first inverter and a second inverter that are cross-coupled between the output node and the output bar node, wherein the first inverter includes multiple legs, wherein the legs are pull-down legs or pull-up legs, wherein one of the legs is to be selectively activated based on a challenge bit string, and wherein the activated leg is used to generate a response bit at the output node;

a first pre-charge transistor coupled to the output node;

a second pre-charge transistor coupled to the output bar node;

a first clock delay circuit coupled to the first pre-charge transistor, the first clock delay circuit to generate a first clock signal and provide the first clock signal to the first pre-charge transistor to cause the first pre-charge transistor to force the output node to a voltage level during a pre-charge phase of the PUF circuit; and a second clock delay circuit coupled to the second pre-charge transistor, the second clock delay circuit to generate a second clock signal and provide the second clock signal to the second pre-charge transistor to cause the second pre-charge transistor to force the output bar node to the voltage level during the pre-charge phase;

wherein the first and second clock delay circuits include multiple delay cells, wherein one of the delay cells is selectively activated based on the challenge bit string, and wherein the activated delay cell is used to generate the respective first or second clock signal; and wherein the response bit is generated during an evaluation phase of the PUF circuit after the pre-charge phase.

21. The PUF circuit of claim 20, wherein the delay cells include one or more inverters.

22. The PUF circuit of claim 20, wherein the second inverter includes multiple legs, and wherein one of the legs of the second inverter is to be selectively activated based on the challenge bit string, and wherein the activated leg of the second inverter is used to generate the response bit at the output node.

23. The PUF circuit of claim 20, further comprising a dark bit masking circuit to generate a soft dark bit mask for the PUF circuit upon power-up of the PUF circuit.

24. The PUF circuit of claim 23, wherein the soft dark bit mask is on a per challenge level, a per leg level, or a per cell level.

25. The PUF circuit of claim 20, wherein the output node, the output bar node, the first inverter, and the second inverter are included in a PUF cell, and wherein the PUF circuit includes multiple PUF cells to generate respective response bits.

\* \* \* \* \*